US012790012B2

(12) United States Patent
Sobanski et al.

(10) Patent No.: US 12,790,012 B2
(45) Date of Patent: Nov. 10, 2026

(54) HOUSING STRUCTURE FOR AN OPEN ROTOR AIRCRAFT PROPULSION SYSTEM

(71) Applicant: RTX Corporation, Farmington, CT (US)

(72) Inventors: Jon E. Sobanski, Glastonbury, CT (US); Jeffrey T. Morton, Manchester, CT (US); Andrew E. Breault, Bolton, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/177,542

(22) Filed: Apr. 12, 2025

(65) Prior Publication Data

US 2026/0316944 A1 Oct. 15, 2026

(51) Int. Cl.
*B64D 29/00* (2006.01)
*B64D 27/10* (2006.01)
*F01D 25/24* (2006.01)

(52) U.S. Cl.
CPC ............. *B64D 29/00* (2013.01); *B64D 27/10* (2013.01); *F01D 25/24* (2013.01)

(58) Field of Classification Search
CPC ......... F01D 25/24; F01D 25/28; B64D 27/10; B64D 27/12; B64D 27/14; B64D 29/00
See application file for complete search history.

(56) References Cited

U.S. PATENT DOCUMENTS

| | | | | |
|---|---|---|---|---|
| 4,471,609 | A * | 9/1984 | Porter | F01D 25/14 244/129.4 |
| 4,976,102 | A | 12/1990 | Taylor | |
| 5,174,525 | A | 12/1992 | Schilling | |
| 8,272,203 | B2 * | 9/2012 | Derenes | F02K 3/06 60/797 |
| 8,444,084 | B2 | 5/2013 | Udall | |
| 8,739,552 | B2 | 6/2014 | Vauchel | |
| 9,828,105 | B2 * | 11/2017 | Cloft | B64D 29/06 |
| 10,336,458 | B2 | 7/2019 | Guillemaut | |
| 10,647,440 | B2 | 5/2020 | Bouchet | |
| 10,723,471 | B2 * | 7/2020 | Stuart | B64D 29/02 |
| 11,939,070 | B2 * | 3/2024 | Schelfaut | B64D 27/404 |
| 12,442,315 | B2 * | 10/2025 | Bowden | F01D 25/28 |
| 2021/0108575 | A1 * | 4/2021 | Adibhatla | F01D 15/12 |
| 2024/0239506 | A1 * | 7/2024 | Bowden | B64D 27/402 |

OTHER PUBLICATIONS

EP Search Report for EP Patent Application No. 26172046.0 dated Jul. 27, 2026.

* cited by examiner

*Primary Examiner* — Nathaniel E Wiehe
*Assistant Examiner* — Jason G Davis
(74) *Attorney, Agent, or Firm* — Getz Balich LLC

(57) ABSTRACT

An assembly for an aircraft propulsion system includes a housing structure. The housing structure includes an engine case assembly and a nacelle. The nacelle is disposed radially outboard of the engine case assembly. The nacelle forms at least a portion of an exterior flow boundary for the aircraft propulsion system that borders an environment external to the aircraft propulsion system. The nacelle includes a nacelle interior skeletal structure mounted to the engine case assembly at a forward mount and an aft mount.

19 Claims, 12 Drawing Sheets

HOUSING STRUCTURE FOR AN OPEN ROTOR AIRCRAFT PROPULSION SYSTEM

BACKGROUND

1. Technical Field

This disclosure relates generally to an aircraft and, more particularly, to a housing structure of an open rotor propulsion system for the aircraft.

2. Background Information

Various types and configurations of aircraft propulsion systems are known in the art including those with one or more open propulsor rotors. While these known aircraft propulsion systems have various benefits, there is still room in the art for improvement.

SUMMARY

According to an aspect of the present disclosure, an assembly for an aircraft propulsion system includes an open propulsor rotor, a housing structure, a compressor section, a combustor section, a turbine section, and a flowpath. The open propulsor rotor includes a plurality of open propulsor blades arranged circumferentially around an axis. Each of the plurality of open propulsor blades projects radially out into an environment external to the aircraft propulsion system. The housing structure includes an upstream housing end. The upstream housing end is disposed downstream of the plurality of open propulsor blades. The housing structure includes an engine case assembly and a nacelle. The nacelle is disposed radially outboard of the engine case assembly. The nacelle forms at least a portion of an exterior flow boundary for the aircraft propulsion system that borders the environment external to the aircraft propulsion system. The nacelle includes a nacelle interior skeletal structure mounted to the engine case assembly at a forward mount and an aft mount. The nacelle interior skeletal structure supports the open propulsor rotor and the engine case assembly. The compressor section, the combustor section, and the turbine section are each housed within the engine case assembly. The turbine section includes a turbine rotor operatively coupled to the open propulsor rotor. The turbine rotor is configured to drive rotation of the open propulsor rotor about the axis. The flowpath extends through the compressor section, the combustor section, and the turbine section from an inlet into the flowpath to an exhaust from the flowpath.

In any of the aspects or embodiments described above and herein, the nacelle interior skeletal structure may be configured for mounting the engine case assembly to a pylon structure of an aircraft.

In any of the aspects or embodiments described above and herein, the engine case assembly may include a front center body at the upstream housing end, the front center body may form the inlet, and the nacelle interior skeletal structure may be mounted to the front center body at the forward mount.

In any of the aspects or embodiments described above and herein, the engine case assembly may further include a turbine exhaust case forming a portion of the flowpath downstream of the turbine section, and the nacelle interior skeletal structure may be mounted to the turbine exhaust case at the aft mount.

In any of the aspects or embodiments described above and herein, the skeletal structure may be mounted to the engine case assembly at one or more intermediate mounting points axially between forward mount and aft mount.

In any of the aspects or embodiments described above and herein, the assembly may further include a guide vane structure including a guide vane structure base disposed at the exterior flow boundary, and the forward mount may be disposed between the upstream housing end and the guide vane structure base.

In any of the aspects or embodiments described above and herein, the nacelle interior skeletal structure may include a composite structure material.

In any of the aspects or embodiments described above and herein, the nacelle interior skeletal structure may include a fixed structure segment, a first pivotable structure segment, and a second pivotable structure segment, the fixed structure segment may be mounted to the engine case assembly at the forward mount and the aft mount, the first pivotable structure segment and the second pivotable structure segment may each be pivotably mounted to the fixed structure segment, the first pivotable structure segment and the second pivotable structure segment may each be pivotable between a stowed position and an open position.

In any of the aspects or embodiments described above and herein, the assembly may further include a guide vane structure comprising a guide vane structure base disposed at the exterior flow boundary, and the first pivotable structure segment and the second pivotable structure segment may be disposed aft of the guide vane structure base.

In any of the aspects or embodiments described above and herein, each of the first pivotable structure segment and the second pivotable structure segment may form a contact point configured to contact the engine case assembly in the stowed position.

In any of the aspects or embodiments described above and herein, each of the first pivotable structure segment and the second pivotable structure segment may be configured to be fixedly attached to the engine case assembly at the contact point in the stowed position.

In any of the aspects or embodiments described above and herein, each of the first pivotable structure segment and the second pivotable structure segment may include a detachable access panel at the exterior flow boundary.

In any of the aspects or embodiments described above and herein, the nacelle interior skeletal structure may be configured to support at least 50 percent of a bending load of the propulsion system.

In any of the aspects or embodiments described above and herein, the assembly may further include a guide vane structure comprising a guide vane structure base disposed at the exterior flow boundary, and the guide vane structure base may be formed by a portion of the nacelle extending circumferentially about the axis.

In any of the aspects or embodiments described above and herein, the guide vane structure may further include a plurality of open guide vanes coupled to the guide vane structure base.

According to another aspect of the present disclosure, an assembly for an aircraft propulsion system includes an open propulsor rotor, a housing structure, a compressor section, a combustor section, a turbine section, and a flowpath. The open propulsor rotor includes a plurality of open propulsor blades arranged circumferentially around an axis. Each of the plurality of open propulsor blades projects radially out into an environment external to the aircraft propulsion system. The housing structure includes an upstream housing end. The upstream housing end is disposed downstream of the plurality of open propulsor blades. The housing structure includes an engine case assembly and a nacelle. The nacelle is disposed radially outboard of the engine case assembly. The nacelle forms at least a portion of an exterior flow boundary for the aircraft propulsion system that borders the environment external to the aircraft propulsion system. The nacelle interior skeletal structure supports the open propulsor rotor and the engine case assembly. The nacelle interior skeletal structure is configured for mounting the engine case assembly to a pylon structure of an aircraft. The compressor section, the combustor section, and the turbine section are each housed within the engine case assembly. The turbine section includes a turbine rotor operatively coupled to the open propulsor rotor. The turbine rotor is configured to drive rotation of the open propulsor rotor about the axis. The flowpath extends through the compressor section, the combustor section, and the turbine section from an inlet into the flowpath to an exhaust from the flowpath.

In any of the aspects or embodiments described above and herein, the nacelle interior skeletal structure may include a fixed structure segment, a first pivotable structure segment, and a second pivotable structure segment, the fixed structure segment may be configured to mount the engine case assembly to the pylon structure, the first pivotable structure segment and the second pivotable structure segment may each be pivotably mounted to the fixed structure segment, the first pivotable structure segment and the second pivotable structure segment may each be pivotable between a stowed position and an open position.

In any of the aspects or embodiments described above and herein, each of the first pivotable structure segment and the second pivotable structure segment may form a contact point configured to contact the engine case assembly in the stowed position.

According to another aspect of the present disclosure, an assembly for an aircraft propulsion system includes an open propulsor rotor, a housing structure, a plurality of open guide vanes, a compressor section, a combustor section, a turbine section, and a flowpath. The open propulsor rotor includes a plurality of open propulsor blades arranged circumferentially around an axis. Each of the plurality of open propulsor blades projects radially out into an environment external to the aircraft propulsion system. The housing structure includes an upstream housing end. The upstream housing end is disposed downstream of the plurality of open propulsor blades. The housing structure includes an engine case assembly and a nacelle. The nacelle is disposed radially outboard of the engine case assembly. The nacelle forms at least a portion of an exterior flow boundary for the aircraft propulsion system that borders the environment external to the aircraft propulsion system. The nacelle includes a nacelle interior skeletal structure mounted to the engine case assembly at a forward mount proximate the upstream housing end and an aft mount. The guide vane structure base is disposed between the forward mount and the aft mount. The guide vane structure base further forms the exterior flow boundary. The plurality of open guide vanes are coupled to the guide vane structure base. The compressor section, the combustor section, and the turbine section are each housed within the engine case assembly. The turbine section includes a turbine rotor operatively coupled to the open propulsor rotor. The turbine rotor is configured to drive rotation of the open propulsor rotor about the axis. The flowpath extends through the compressor section, the combustor section, and the turbine section from an inlet into the flowpath to an exhaust from the flowpath.

In any of the aspects or embodiments described above and herein, the engine case assembly may include a front center body at the upstream housing end, the front center body may form the inlet, and the nacelle interior skeletal structure may be mounted to the front center body at the forward mount.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
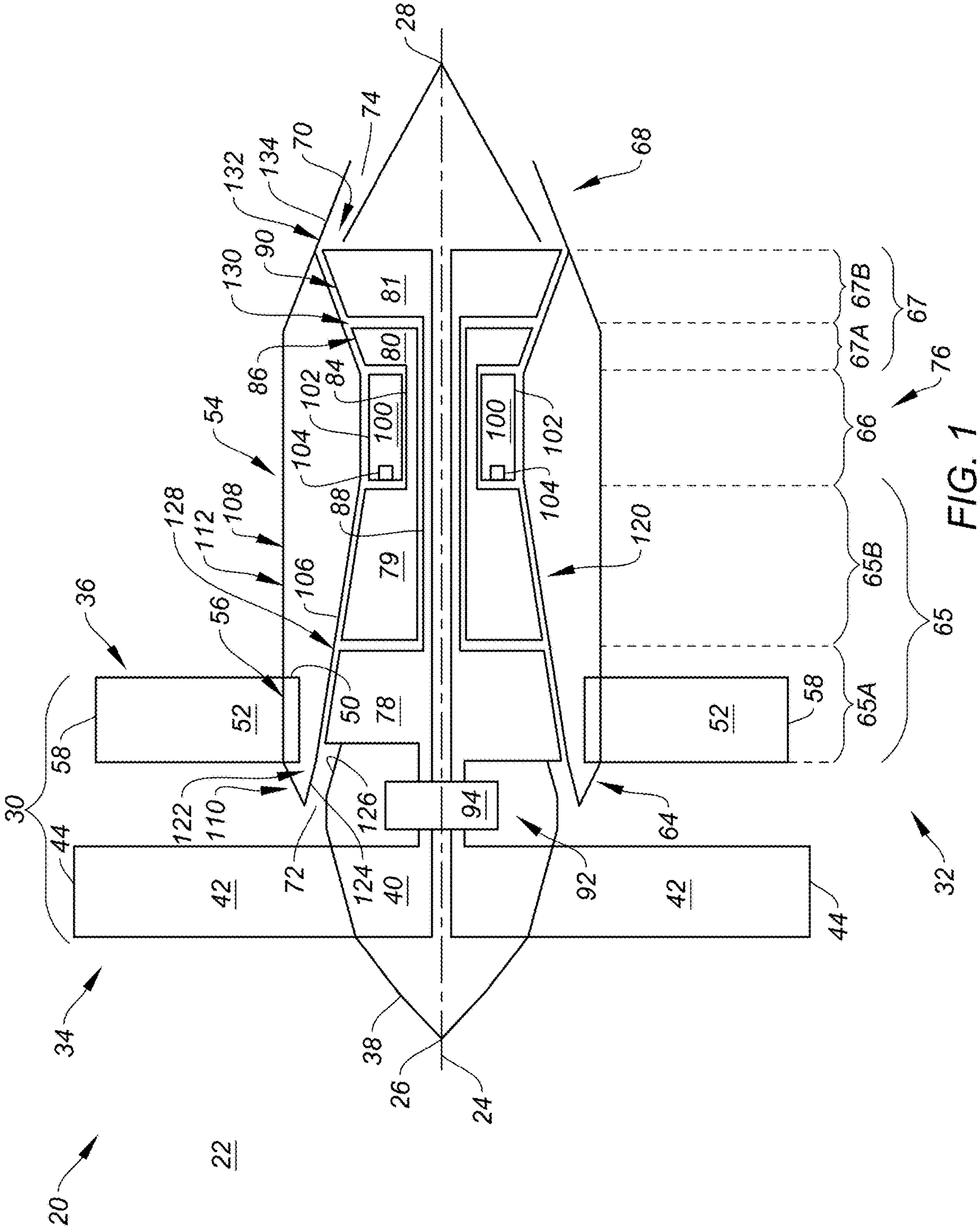
FIG. 1 schematically illustrates a cutaway, side view of an aircraft propulsion system, in accordance with one or more embodiments of the present disclosure.

FIG. 1 is a schematic illustration of a propulsion system 20 for an aircraft. The aircraft may be an airplane, a drone (e.g., an unmanned aerial vehicle (UAV)), or any other manned or unmanned aerial vehicle or system. The aircraft propulsion system 20 may be configured as an open rotor propulsion system with a single open rotor and swirl recovery vane (SRV) architecture. Herein, the term "open" may describe a propulsion system section and/or a propulsion system component which is open to an environment 22 (e.g., an ambient environment) external to the aircraft propulsion system 20 and, more generally, the aircraft. However, aspects of the present disclosure may be equally applicable to some other aircraft propulsion system configurations including those having ducted propulsors.

The aircraft propulsion system 20 extends axially along an axis 24 between an upstream, forward end 26 of the aircraft propulsion system 20 and a downstream, aft end 28 of the aircraft propulsion system 20. The propulsion system axis 24 may be a centerline axis of the aircraft propulsion system 20 and/or a centerline axis of one or more members of the aircraft propulsion system 20. The propulsion system axis 24 may also or alternatively be a rotational axis of one or more members of the aircraft propulsion system 20. The aircraft propulsion system 20 of FIG. 1 includes an open rotor propulsion section 30 and a gas turbine engine 32.

The propulsion section 30 of FIG. 1 includes an open propulsor rotor 34 and an open guide vane structure 36. These propulsion section members 34 and 36 are un-ducted and/or unshrouded components of the aircraft propulsion system 20 and its propulsion section 30. In some embodiments, however, one or more of the propulsion section members 34 and 36 may be un-ducted yet may each include a small shroud. The propulsion section 30 also includes a nose cone 38 disposed at (e.g., on, adjacent or proximate) the propulsion system forward end 26. Briefly, this nose cone 38 may be configured as a spinner which is rotatable with the propulsor rotor 34 about the propulsion system axis 24. Alternatively, the nose cone 38 may be configured as a stationary structure of the propulsion section 30.

The propulsor rotor 34 includes a rotor base 40 (e.g., a disk or a hub) and a plurality of open propulsor blades 42 (e.g., airfoils). The propulsor blades 42 are arranged and may be equispaced circumferentially about the rotor base 40 and the propulsion system axis 24 in an array (e.g., a circular array). Each of the propulsor blades 42 is connected to (e.g., formed integral with or otherwise attached to) the rotor base 40. Each of the propulsor blades 42 projects spanwise along a span line of the respective propulsor blade 42 (e.g., radially relative to the propulsion system axis 24) out from an exterior surface of the rotor base 40, into the external environment 22, to an unshrouded distal tip 44 of the respective propulsor blade 42. Each propulsor blade 42 is thereby configured as an un-ducted and unshrouded propulsor blade 42 which is exposed to (e.g., disposed in) the surrounding external environment 22.

Figure 2:
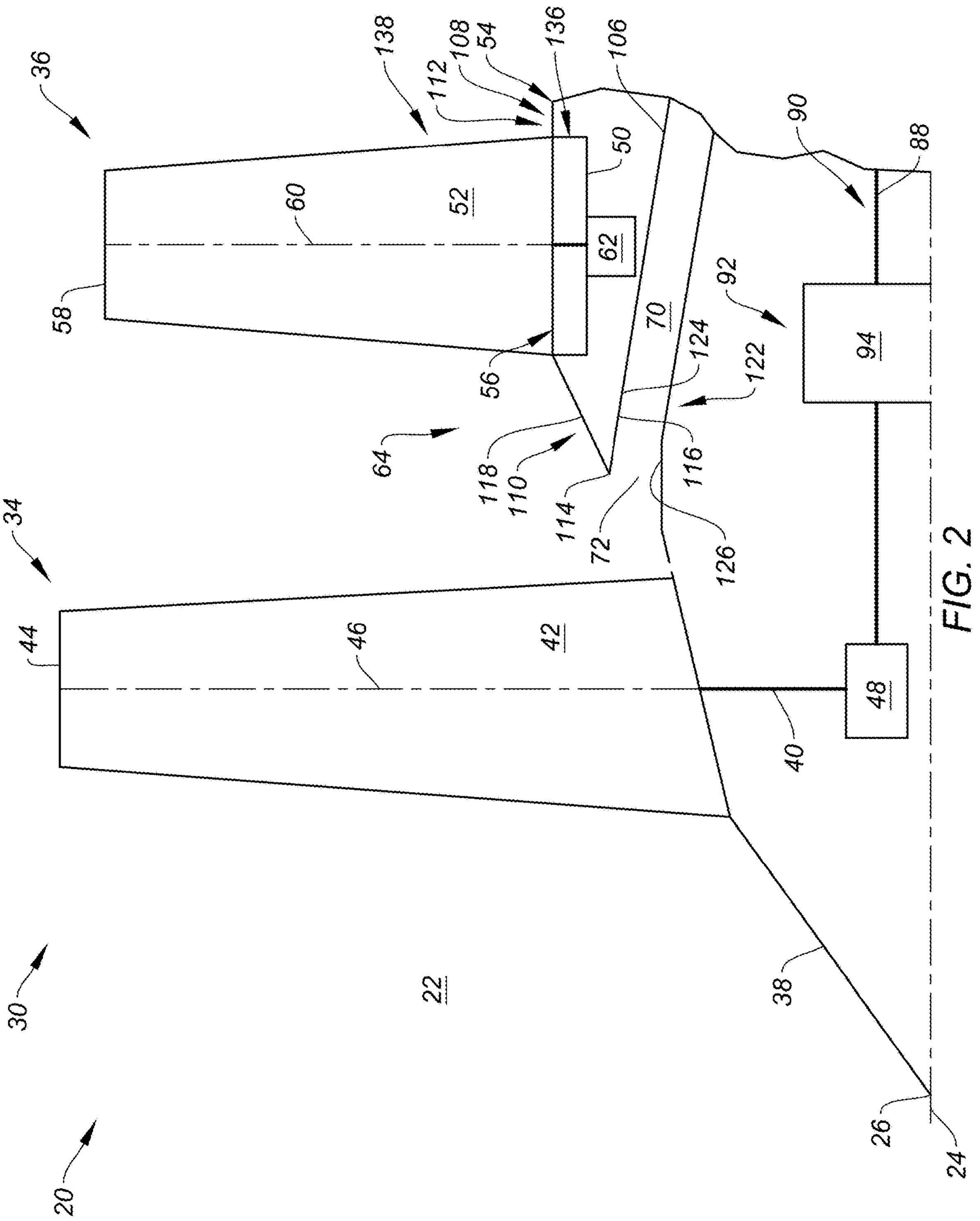
FIG. 2 schematically illustrates a cutaway, side view of a portion of the aircraft propulsion system, in accordance with one or more embodiments of the present disclosure.

Referring to FIG. 2, each propulsor blade 42 may be configured to pivot about a respective blade pivot axis 46. This blade pivot axis 46 extends radially relative to the propulsion system axis 24. The blade pivot axis 46 of FIG. 2, for example, is arranged perpendicular to the propulsion system axis 24 when viewed, for example, in a longitudinal reference plane parallel to (e.g., including) the propulsion system axis 24 (e.g., the plane of FIG. 2). Each propulsor blade 42 of FIG. 2 is operatively coupled with a blade actuation system 48. This blade actuation system 48 is configured to pivot each propulsor blade 42 about its own respective blade pivot axis 46. By pivoting each propulsor blade 42 about its blade pivot axis 46, a pitch of the respective propulsor blade 42 may be changed. Note, while the blade pivot axis 46 is shown in FIG. 2 as being perpendicular to the propulsion system axis 24, it is contemplated this blade pivot axis 46 may or may not be coincident with the propulsion system axis 24. Moreover, it is contemplated each blade pivot axis 46 may alternatively be angularly offset from the propulsion system axis 24 by an acute angle or an obtuse angle when viewed, for example, in the longitudinal reference plane. Of course, it is contemplated that some or all of the propulsor blades 42 may be alternatively moved to change the propulsor blade pitch. Moreover, it is contemplated that some or all of the propulsor blades 42 may alternatively be fixed pitch propulsor blades in other embodiments.

The guide vane structure 36 of FIG. 1 includes a guide vane structure base 50 (e.g., a support ring, a skinned support frame, etc.) and a plurality of the open exit guide vanes 52 (e.g., airfoils). Briefly, at least (or only) an outer radial side of the structure base 50 and an outer radial side of a stationary housing structure 54 for the aircraft propulsion system 20 collectively form an aerodynamic exterior flow boundary 56 of the aircraft propulsion system 20 (e.g., a propulsion system mold line) which borders the external environment 22. The guide vanes 52, sometimes referred to as "swirl recovery vanes (SRVs), are arranged and may be equispaced circumferentially about the propulsion system axis 24 and the structure base 50 in an array (e.g., a circular array). This guide vane structure 36 and its guide vanes 52 are arranged axially next to (e.g., adjacent) the propulsor rotor 34 and its propulsor blades 42. The guide vane structure 36 and its guide vanes 52 of FIG. 1, for example, are arranged downstream of the propulsor rotor 34 and its propulsor blades 42, for example, without (e.g., any) other elements axially therebetween to obstruct, turn and/or otherwise influence the air propelled by the propulsor rotor 34 to the guide vane structure 36. Each of the guide vanes 52 of FIG. 1 is coupled to the structure base 50. Each of the guide vanes 52 projects spanwise along a span line of the respective guide vane 52 (e.g., radially relative to the propulsion system axis 24) out from the structure base 50 at the exterior flow boundary 56, into the external environment 22, to a distal tip 58 of the respective guide vane 52, which may be unshrouded or shrouded. Each guide vane 52 is thereby configured as an un-ducted and/or unshrouded guide vane which is exposed to (e.g., disposed in) the surrounding external environment 22.

Referring to FIG. 2, each guide vane 52 may be configured to pivot about a respective vane pivot axis 60. This vane pivot axis 60 extends radially relative to the propulsion system axis 24. The vane pivot axis 60 of FIG. 2, for example, is arranged perpendicular to the propulsion system axis 24 when viewed, for example, in the longitudinal reference plane. Each guide vane 52 of FIG. 2 is operatively coupled with a vane actuation system 62, which vane actuation system 62 of FIG. 2 may be discrete from or integrated as part of the blade actuation system 48. The vane actuation system 62 is configured to pivot each guide vane 52 about its own respective vane pivot axis 60. By pivoting each guide vane 52 about its vane pivot axis 60, a pitch of the respective guide vane 52 may be changed. Note, while the vane pivot axis 60 is shown in FIG. 2 as being perpendicular to the propulsion system axis 24, it is contemplated this vane pivot axis 60 may or may not be coincident with the propulsion system axis 24. Moreover, it is contemplated that each vane pivot axis 60 may alternatively be angularly offset from the propulsion system axis 24 by an acute angle or an obtuse angle when viewed, for example, in the longitudinal reference plane. Of course, it is contemplated some or all of the guide vanes 52 may be alternatively moved to change the guide vane pitch. Moreover, it is contemplated that some or all of the guide vanes 52 may alternatively be fixed pitch guide vanes in other embodiments.

The guide vane structure 36 is described above as a fixed (e.g., non-rotatable) guide vane structure. It is contemplated, however, that the guide vane structure 36 may alternatively be selectively rotatable about the propulsion system axis 24. With such an arrangement, the aircraft propulsion system 20 may be configured as an open rotor propulsion system with a swirl recovery blade (SRB) open rotor architecture. More particularly, the aircraft propulsion system 20 may operate as: (A) a counter-rotating open rotor (CROR) propulsion system during a dual rotor mode of operation (e.g., when both the propulsor rotor 34 and the structure 36 are counter-rotating about the propulsion system axis 24); and (B) a single open rotor and swirl recovery vane (SRV) propulsion system during a single rotor mode of operation (e.g., when the propulsor rotor 34 is rotating and the structure 36 is rotationally fixed about the propulsion system axis 24). Note, when the guide vane structure 36 is configured to selectively rotate about the propulsion system axis 24, the moving guide vanes 52 operate as propulsor blades.

Referring to FIG. 1, the turbine engine 32 includes an inlet section 64, a compressor section 65, a combustor section 66, a turbine section 67 and an exhaust section 68. The compressor section 65 of FIG. 1 includes a low-pressure compressor (LPC) section 65A and a high-pressure compressor (HPC) section 65B. The turbine section 67 of FIG. 1 includes a high-pressure turbine (HPT) section 67A and a low-pressure turbine (LPT) section 67B. The turbine engine 32 also includes an (e.g., annular) engine flowpath 70 which extends longitudinally through the aircraft propulsion system 20 of FIG. 1 and its turbine engine 32 from a (e.g., annular) flowpath inlet 72 into the engine flowpath 70 to a (e.g., annular) combustion products exhaust 74 from the engine flowpath 70. The flowpath inlet 72 is also an airflow inlet into the aircraft propulsion system 20 of FIG. 1 and its turbine engine 32. The flowpath exhaust 74 is also a combustion products exhaust from the aircraft propulsion system 20 of FIG. 1 and its turbine engine 32. At least (or only) the LPC section 65A, the HPC section 65B, the combustor section 66, the HPT section 67A and the LPT section 67B collectively form a core 76 (e.g., a gas generator) of the turbine engine 32.

Each of the engine sections 65A, 65B, 67A and 67B includes a respective bladed rotor 78-81 (e.g., a ducted and/or shrouded engine rotor). Each of these engine rotors 78-81 includes a rotor base (e.g., a disk or a hub) and a plurality of rotor blades (e.g., airfoils, vanes, etc.). The rotor blades are arranged and may be equispaced circumferentially around the respective rotor base in an array. The rotor blades may also be arranged into one or more stages longitudinally along the engine flowpath 70. Each of the rotor blades is connected to the respective rotor base. Each of the rotor blades projects radially (e.g., spanwise) out from the respective rotor base into the engine flowpath 70 and to a distal tip of the respective rotor blade.

The HPC rotor 79 is coupled to and rotatable with the HPT rotor 80. The HPC rotor 79 of FIG. 1, for example, is connected to the HPT rotor 80 by a high-speed shaft 84. At least (or only) the HPC rotor 79, the HPT rotor 80, and the high-speed shaft 84 collectively form a high-speed rotating structure 86 (e.g., a high-speed spool of the engine core 76). This high-speed rotating structure 86 of FIG. 1 and its members 79, 80, and 84 are rotatable about the propulsion system axis 24. However, in other embodiments, the high-speed rotating structure 86 and its members 79, 80, and 84 may alternatively be rotatable about another rotational axis which is (e.g., laterally and/or angularly) offset from the rotational axis of the propulsor rotor 34.

The LPC rotor 78 is coupled to and rotatable with the LPT rotor 81. The LPC rotor 78 of FIG. 1, for example, is connected to the LPT rotor 81 by a low-speed shaft 88. At least (or only) the LPC rotor 78, the LPT rotor 81, and the low-speed shaft 88 collectively form a low-speed rotating structure 90 (e.g., a low-speed spool of the engine core 76). This low-speed rotating structure 90 of FIG. 1 and its members 78, 81, and 88 are rotatable about the propulsion system axis 24. However, in other embodiments, the low-speed rotating structure 90 and its members 78, 81, and 88 may alternatively be rotatable about another rotational axis which is (e.g., laterally and/or angularly) offset from the rotational axis of the propulsor rotor 34.

The low-speed rotating structure 90 is coupled to the propulsor rotor 34 through a drivetrain 92. This drivetrain 92 may be configured as a geared drivetrain, where a geartrain 94 (e.g., a transmission, a speed change device, an epicyclic geartrain, etc.) is disposed between and operatively couples the propulsor rotor 34 to the low-speed rotating structure 90 and its LPC rotor 78 and its LPT rotor 81. With this arrangement, the propulsor rotor 34 may rotate at a different (e.g., slower) rotational speed than the low-speed rotating structure 90 and its LPC rotor 78 and its LPT rotor 81. Here, the propulsor rotor 34 and the low-speed rotating structure 90 may rotate in a common (the same) direction about the propulsion system axis 24 or in opposite directions about the propulsion system axis 24 depending, for example, upon the specific configuration of the geartrain 94. Alternatively, the drivetrain 92 may be configured as a direct-drive drivetrain, where the geartrain 94 is omitted. With such an arrangement, the propulsor rotor 34 rotates at a common (the same) rotational speed as the low-speed rotating structure 90 and its LPC rotor 78 and its LPT rotor 81.

The turbine engine 32 of FIG. 1 is described above with a particular two rotating structure arrangement. The present disclosure, however, is not limited to such an exemplary arrangement. For example, the LPC rotor 78 may be omitted to configure the LPT rotor 81 as a power turbine (PT) rotor for the propulsor rotor 34. In another example, the turbine engine 32 may also include another rotating structure (e.g., an intermediate speed spool) for the engine core 76.

During operation of the aircraft propulsion system 20 of FIG. 1, ambient air within the external environment 22 is propelled by the rotating propulsor rotor 34 in the downstream, aft direction towards the propulsion system aft end 28. A major portion (e.g., more than 50%) of this air bypasses the turbine engine 32 to provide forward thrust while a minor portion (e.g., less than 50%) of the air flows into the turbine engine 32. For example, an outer stream of the air propelled by the rotating propulsor rotor 34 flows axially across the guide vane structure 36 and outside of the housing structure 54 and the structure base 50 (e.g., along the exterior flow boundary 56). The guide vane structure 36 conditions (e.g., straightens out, de-swirls, etc.) the outer stream of air within the external environment 22 to enhance the forward thrust. By contrast, an inner stream of the air propelled by the rotating propulsor rotor 34 may bypass the guide vane structure 36 and enter the turbine engine 32 and its engine flowpath 70 through the flowpath inlet 72. The air entering the engine flowpath 70 through the flowpath inlet 72 may be referred to as "core air".

The core air is compressed by the LPC rotor 78 and the HPC rotor 79 and directed into a combustion chamber 100 (e.g., an annular combustion chamber) of a combustor 102 (e.g., an annular combustor) in the combustor section 66. Fuel is injected into the combustion chamber 100 by one or more fuel injectors 104 and mixed with the compressed core air to provide a fuel-air mixture. This fuel-air mixture is ignited, and combustion products thereof flow through and sequentially drive rotation of the HPT rotor 80 and the LPT rotor 81. The rotation of the HPT rotor 80 and the LPT rotor 81 respectively drive rotation of the HPC rotor 79 and the LPC rotor 78 and, thus, compression of the core air. The rotation of the LPT rotor 81 also drives the rotation of the propulsor rotor 34 through the geartrain 94. The turbine engine 32 and its low-speed rotating structure 90 thereby power operation of (e.g., drive rotation of) the propulsor rotor 34 during aircraft propulsion system operation.

The engine sections 64-68 may be arranged sequentially along the propulsion system axis 24 and are housed within and/or formed by the housing structure 54. This housing structure 54 includes an engine case assembly 106 and a nacelle 108. The engine case assembly 106 houses one or more of the engine sections 65A-67B (e.g., the engine core 76). The engine case assembly 106 of FIG. 1, for example, extends axially along (e.g., axially overlaps) and extends circumferentially about (e.g., circumscribes) the engine sections 65A-67B and their respective bladed rotors 78-81. The engine case assembly 106 may also house the geartrain 94.

The nacelle 108 houses and provides an aerodynamic cover over the engine case assembly 106. The nacelle 108 of FIG. 1, for example, is disposed radially outboard of, extends axially along (e.g., axially overlaps) and extends circumferentially about (e.g., circumscribes) the engine core 76 and its engine case assembly 106. With the foregoing arrangement, the bladed rotors 78-81 are disposed within the housing structure 54. By contrast, the propulsor blades 42 and the guide vanes 52 are disposed (e.g., completely) outside of the housing structure 54.

The nacelle 108 of FIG. 2 includes an inlet structure 110 and an aft nacelle structure 112 (see also FIG. 1). The inlet structure 110 is disposed at an upstream, forward end 114 of the housing structure 54 next to and downstream of the propulsor rotor 34 and its propulsor blades 42. The inlet structure 110 is configured as an annular airflow splitter (e.g., an annular inlet lip of the nacelle 108) which splits the airflow propelled by the propulsor rotor 34 into the outer stream and the inner stream. An inner radial portion 116 of the inlet structure 110 of FIG. 2, for example, forms an outer peripheral boundary of the flowpath inlet 72 into the aircraft propulsion system 20 at the housing structure forward end 114. An outer radial portion 118 of the inlet structure 110 forms an upstream, forward axial section of the exterior flow boundary 56, upstream and forward of the guide vane structure 36 and its structure base 50. This outer portion 118 of the inlet structure 110 meets the inner portion 116 of the inlet structure 110 at the housing structure forward end 114. The aft nacelle structure 112 forms a downstream, aft axial section of the exterior flow boundary 56, downstream and aft of the guide vane structure 36 and its structure base 50. As will be discussed in further detail, this aft nacelle structure 112 may include one or more nacelle cowls disposed to opposing lateral sides of the aircraft propulsion system 20. Each of these nacelle cowls may be configured to pivot or otherwise move from a stowed position (for propulsion system operation) to an open position (for accessing engine accessories and/or the engine core 76 during turbine engine maintenance, inspection or the like).

The engine case assembly 106 includes a plurality of interconnected engine case structures 120 collectively forming the engine case assembly 106. The engine case structures 120 include a front center body (FCB) 122. The front center body 122 is disposed at (e.g., on, adjacent, or proximate) the housing structure forward end 114 and, in particular, axially between the propulsor blades 42 and the low-pressure compressor section 65A. The front center body 122 of FIGS. 1 and 2 includes an outer radial case structure 124 and an inner radial case structure 126. The outer radial case structure 124 and the inner radial case structure 126 extend circumferentially about (e.g., completely around) the axis 24. The outer radial case structure 124 forms a portion of the inlet structure 110 and its inner radial portion 116. The inner radial case structure 126 is disposed radially inward of the outer radial case structure 124. The inner radial case structure 126 may circumscribe and support the geartrain 94. The outer radial case structure 124 and the inner radial case structure 126 form the flowpath inlet 72 radially therebetween. The front center body 122 may generally form the engine flowpath 70 from the flowpath inlet 72 to the low-pressure compressor section 65A. The engine case structures 120 may also include, but are not limited to, an intermediate case (IMC) 128, a mid-turbine frame (MTF) 130, and/or a turbine exhaust case (TEC) 132. The intermediate case 128 forms a portion of the engine flow path 70 between the low-pressure compressor section 65A and the high-pressure compressor section 65B. The mid-turbine frame 130 forms a portion of the engine flow path 70 between the high-pressure turbine section 67A and the low-pressure turbine section 67B. The turbine exhaust case 132 forms a portion of the engine flow path 70 downstream of the turbine section 67, for example, between the turbine section 67 and the flowpath exhaust 74.

With continued reference to FIGS. 1 and 2, the aft nacelle structure 112 or, more generally, the housing structure 54 may also include an exhaust nozzle 134 which forms an outer peripheral boundary of the flowpath exhaust 74. The nacelle 108 may form a guide vane receptacle for the guide vane structure 36 wherein the guide vane structure 36 may mate with the housing structure 54. Herein, the term "receptacle" is used to describe an open space (e.g., unoccupied volume) in the aircraft propulsion system 20 inboard of the exterior flow boundary 56. This open space may or may not be defined by walls within the aircraft propulsion system 20. For example, a radial inner side (e.g., a bottom side) of the vane structure receptacle 136 may be formed by the engine case assembly 106, one or more mounting structures attached to the engine case assembly 106, and/or peripheral equipment mounted with the engine case assembly 106. In another example, an axial side of the vane structure receptacle 136 may be formed by various supports, frames, accessories and/or the like part of and/or housed radially beneath the nacelle structures 110, 112. The structure base 50 may be disposed within the vane structure receptacle 136 such that the outer side of the structure base 50 may be flush with outer radial sides of the nacelle structures 110, 112 to collectively form the exterior flow boundary 56. With this arrangement, the guide vane structure 36 may be configured as a module 138 which may be removed from or installed with the rest of the aircraft propulsion system 20 (e.g., propulsion system members 32, 34 and 54) as a single unit.

Figure 3:
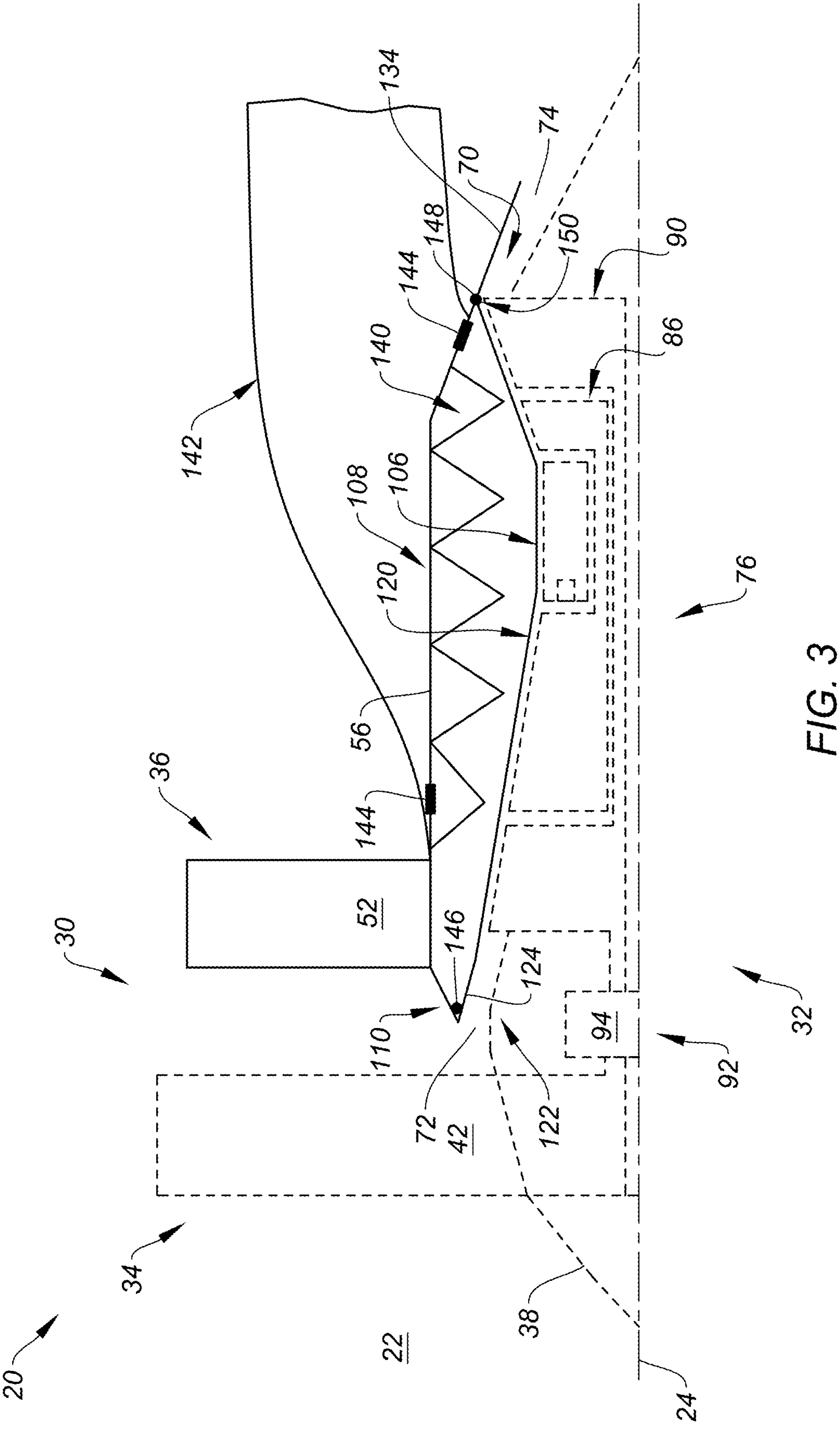
FIGS. 3 and 3A schematically illustrate cutaway, side views of a portion of the aircraft propulsion system including a nacelle interior skeletal structure, in accordance with one or more embodiments of the present disclosure.
Figure 4:
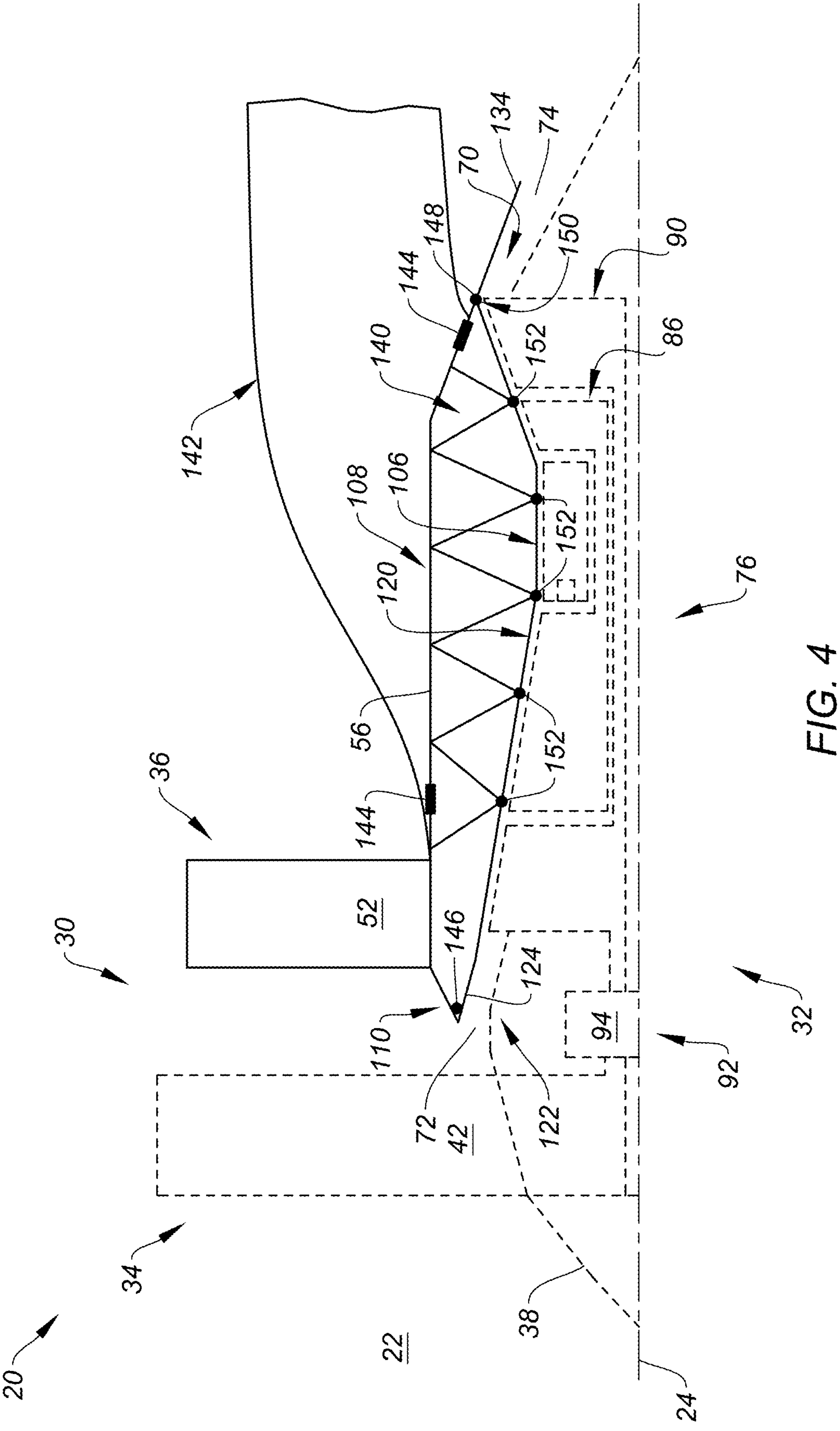
FIG. 4 schematically illustrates a cutaway, side view of a portion of the aircraft propulsion system including another nacelle interior skeletal structure, in accordance with one or more embodiments of the present disclosure.

Referring to FIGS. 3 and 4, the present disclosure nacelle 108 includes an interior skeletal structure 140 mounting the propulsion system 20 onto a pylon structure 142, which pylon structure 142 mounts the propulsion system 20 onto the aircraft (e.g., to a wing, fuselage, empennage, etc.). This interior skeletal structure 140 may be characterized by a skeletal frame, an interconnected beam structure, a lattice structure arrangement, and/or the like configured to support the load of the propulsion system 20 from the pylon structure 142. The interior skeletal structure 140 is disposed radially between the exterior flow boundary 56 and the engine core 76 (e.g., the engine case assembly 106). The nacelle 108, with its interior skeletal structure 140, is configured to structurally support the open propulsor rotor 34 and the engine core 76, and mount the engine core 76 (e.g., the engine case assembly 106) to the pylon structure 142. In other words, the engine case assembly 106 is not mounted directly to the pylon structure 142, but rather indirectly through the interior skeletal structure 140. The interior skeletal structure 140 is mounted to the pylon structure 142 at one or more pylon mounts 144.

The interior skeletal structure 140 extends (e.g., axially) at least between and to a forward mount 146 and an aft mount 148, which forward mount 146 and aft mount 148 fixedly mount the interior skeletal structure 140 to the engine case assembly 106. The interior skeletal structure 140 may be disposed primarily along a top (e.g., top dead center (TDC)) of the propulsion system 20 between the case assembly 106 and the pylon structure 142. For example, the interior skeletal structure 140 may be disposed within less than 50 percent of a circumference of the nacelle 108 or, in some embodiments, less than 30 percent of the circumference of the nacelle 108. Alternatively, in some embodiments, the interior skeletal structure 140 may be a full-hoop structure extending completely circumferentially around or substantially completely circumferentially around the axis 24. The interior skeletal structure 140 includes a structure material. The structure material may form all or a substantial portion of the interior skeletal structure 140. In some embodiments, structure material may be or include a composite material such as a fiber-reinforced polymer (e.g., a thermoplastic or thermoset polymer) material. In some other embodiments, the structure material may be or include a metal or metal alloy material.

Figure 3A:
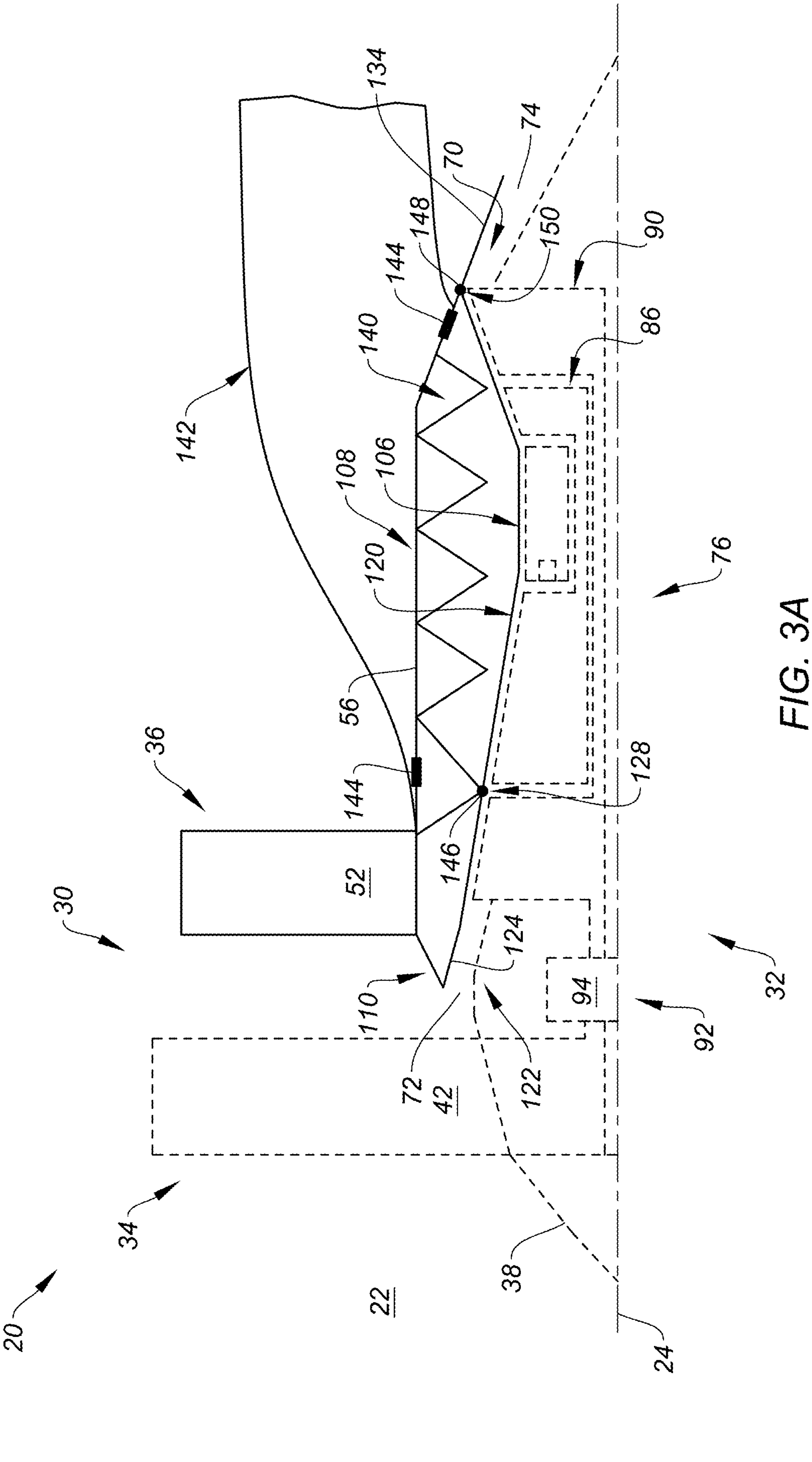

As shown in FIG. 3, the interior skeletal structure 140 may be mounted to the engine case assembly 106 at (e.g., only at) the forward mount 146 and the aft mount 148. The forward mount 146 of FIG. 3 is disposed axially forward of the guide vane structure 36. For example, the forward mount 146 of FIG. 3 is mounted to the front center body 122 on the outer radial case structure 124. Alternatively, as shown in FIG. 3A, the forward mount 146 may be mounted to the intermediate case 128 (e.g., between the low-pressure compressor section 65A and the high-pressure compressor section 65B (see FIG. 1)). Accordingly, the interior skeletal structure 140 may be disposed (e.g., entirely disposed) aft of the guide vane structure 36, for example, forming portions of the aft nacelle structure 112. The aft mount 148 is disposed at (e.g., on, adjacent, or proximate) a downstream, aft end 150 of the engine case assembly 106. For example, the aft mount 148 of FIGS. 3 and 3A is mounted to the turbine exhaust case 132.

As shown in FIG. 4, the interior skeletal structure 140 may be fixedly mounted to the engine case assembly 106 at one or more intermediate mounts 152 between the forward mount 146 and the aft mount 148.

Figure 5:
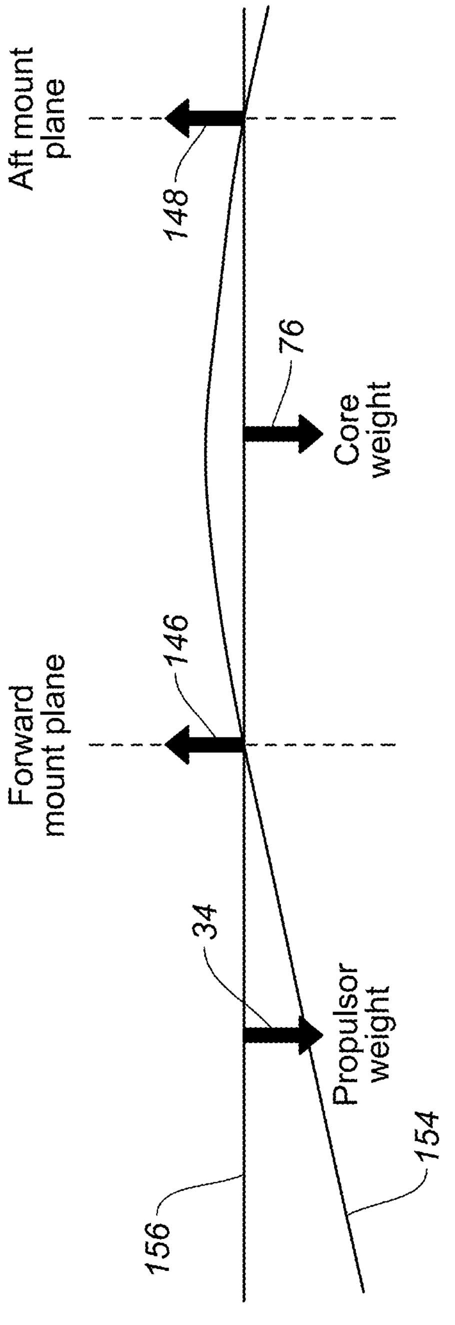
FIG. 5 illustrates a simplified bending load profile for the aircraft propulsion system, in accordance with one or more embodiments of the present disclosure.

FIG. 5 illustrates a simplified bending load profile for the propulsion system 20 along its axis 24 (see FIG. 1). In particular, FIG. 5 illustrates a deflected shape profile 154 of the propulsion system 20 relative to a nominal (e.g., unloaded) shape profile 156 for the propulsion system 20. The deflected shape profile 154 of FIG. 5 is representative of a magnitude of the propulsion system 20 deflection in response to the weights of the open propulsor rotor 34 and the engine core 76 and the interior skeletal structure 140 support at the forward mount 146 (e.g., a forward mount plane orthogonal to the axis 24) and the aft mount 148 (e.g., an aft mount plane orthogonal to the axis 24) (see FIGS. 1-4). Additional bending load conditions not depicted in FIG. 5 may include, but are not limited to, aero loading conditions, inertial loading conditions (e.g., hard landing, maneuvers, etc.), and blade-out loading conditions. A magnitude of the deflected shape profile 154 may be further reduced where the interior skeletal structure 140 includes the intermediate mounts between the interior skeletal structure 140 and the engine case assembly 106 (see FIG. 4). In some embodiments, the interior skeletal structure 140, as described above, may support greater than 50 percent of a bending load experienced by the propulsion system 20, thereby reducing backing bending of the turbine engine 32 (e.g., the engine case assembly 106).

The present disclosure nacelle 108 mounting architecture and interior skeletal structure 140 facilitates a weight-efficient mount and pylon structure configuration relative to at least some conventional aircraft propulsion systems and, in particular, open rotor propulsion systems. The axial span of the interior skeletal structure 140 mounted on the engine case assembly 106 at the forward mount 146 and the aft mount 148 supports the propulsion system 20 closer to its center of gravity, thereby decreasing the bending load reacted by the engine core 76. Accordingly, the present disclosure configuration of the nacelle 108 further facilitates reduced backbone bending of the turbine engine 32 during normal operation, thereby allowing tighter bladed rotor tip clearances and provides greater packaging space within the engine core 76. The additional intermediate mounts 152 shown in FIG. 4 may additionally constrain the engine case assembly 106 to further minimize backbone bending, as the nacelle 108 (e.g., the interior skeletal structure 140) provides additional structural support for the engine case assembly 106. Moreover, the present disclosure structural nacelle 108 facilitates installation of the turbine engine 32 and the nacelle 108 onto the pylon structure 142 as a unit, as opposed to mounting a turbine engine onto a pylon structure and then installing a nacelle as an aerodynamic fairing for the turbine engine.

Figure 7:
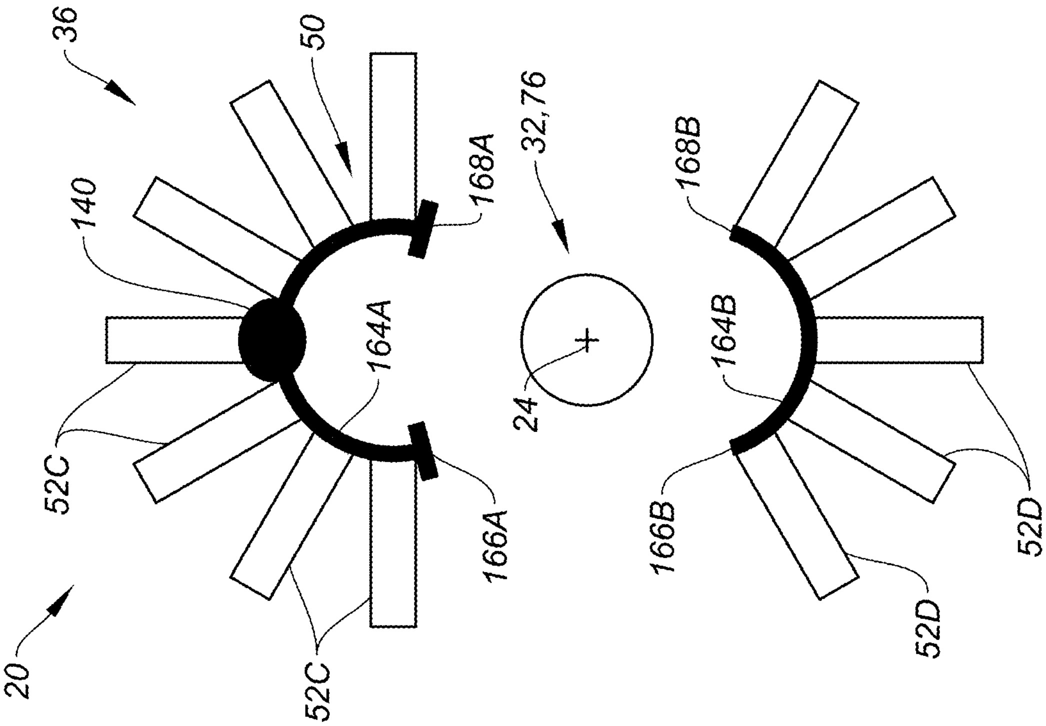
FIG. 7 schematically illustrates a cutaway view of the segmented guide vane structure of FIG. 6 in an open arrangement, in accordance with one or more embodiments of the present disclosure.
Figure 6:
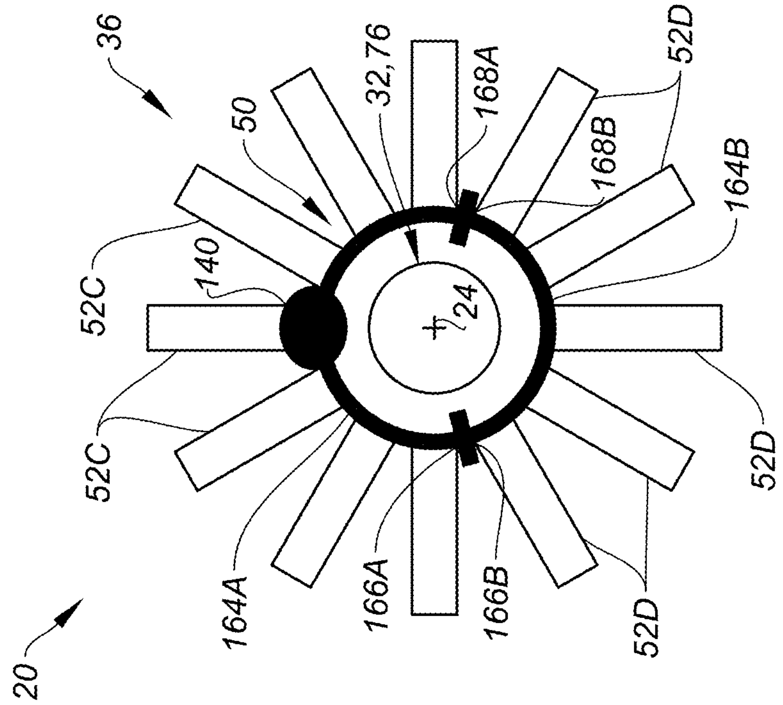
FIG. 6 schematically illustrates a cutaway view of a segmented guide vane structure in a stowed arrangement, in accordance with one or more embodiments of the present disclosure.

In some embodiments, referring to FIGS. 6 and 7, the structure base 50 may be circumferentially segmented into a plurality of structure segments 164A and 164B (generally referred to as "164"). Each of these structure segments 164A, 164B extends circumferentially about the propulsion system axis 24 and the turbine engine 32 between circumferentially opposing ends 166A, 166B (generally referred to as "166") and 168A, 168B (generally referred to as "168") of the respective structure segment 164. The second structure segment 164B, for example, may extend between ninety) (90°) and three-hundred degrees (300°) inclusive about the propulsion system axis 24 between its opposing circumferential ends 166B and 168B. More particularly, the second structure segment 164B may extend between one-hundred and sixty degrees (160°) and two-hundred degrees (200°) inclusive about the propulsion system axis 24 between its opposing circumferential ends 166B and 168B. The first structure segment 164A may then extend a remainder of the full three-hundred-and-sixty-degree hoop of the structure base 50 about the propulsion system axis 24 between its opposing circumferential ends 166A and 168A. For example, the first structure segment 164A extends sixty degrees (60°) centered about the pylon structure 142 and the second structure segment 164B extends three-hundred degrees (300°) to mate 166A to 166B, and 168A to 168B.

The first structure segment 164A of FIG. 6 (e.g., a top structure segment, a fixed structure segment, etc.) may be mounted to, integrated with, and/or otherwise connected to the pylon structure 142. Additionally or alternatively, the first structure segment 164A of FIG. 6 (e.g., a top structure segment, a fixed structure segment, etc.) may be mounted to, integrated with, and/or otherwise connected to the nacelle 108 (e.g., the interior skeletal structure 140). The second structure segment 164B of FIG. 8 (e.g., a bottom structure segment, a removable structure segment, etc.) is disposed diametrically opposite the first structure segment 164A. At the segment first ends 166, the second structure segment 164B is attached (e.g., mechanically fastened) to the first structure segment 164A. Similarly, at the segment second ends 168, the second structure segment 164B is attached (e.g., mechanically fastened) to the first structure segment 164A. With this arrangement, referring to FIG. 7, the second structure segment 164B may be detached from the first structure segment 164A to remove the second structure segment 164B from the aircraft propulsion system 20 and provide access to the turbine engine 32 and its engine core 76 for maintenance, inspection and/or otherwise. The removal of the second structure segment 164B may also provide an opening through which the turbine engine 32 and its engine core 76 and/or other turbine engine components, etc. may be removed from or installed with the aircraft propulsion system 20.

Each structure segment 164A, 164B of FIG. 6 is associated with a set of one or more of the guide vanes 52C, 52D (generally referred to as "52"). Each of the first set guide vanes 52C is connected to and projects radially out from the first structure segment 164A. Each of the second set guide vanes 52D is connected to and projects radially out from the second structure segment 164B. Note, while each set of the guide vanes 52 in FIG. 7 is shown with a different number of the guide vanes 52, it is contemplated the guide vane sets may alternatively be configured with a common number of the guide vanes 52.

Figure 9:
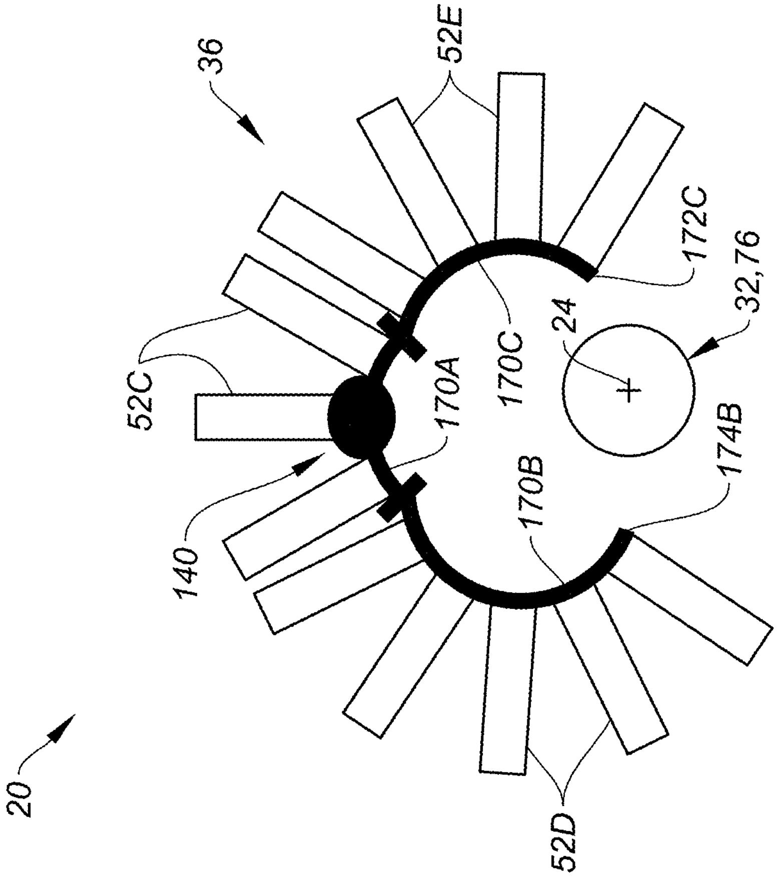
FIG. 9 schematically illustrates a cutaway view of the segmented guide vane structure of FIG. 8 in an open arrangement, in accordance with one or more embodiments of the present disclosure.
Figure 8:
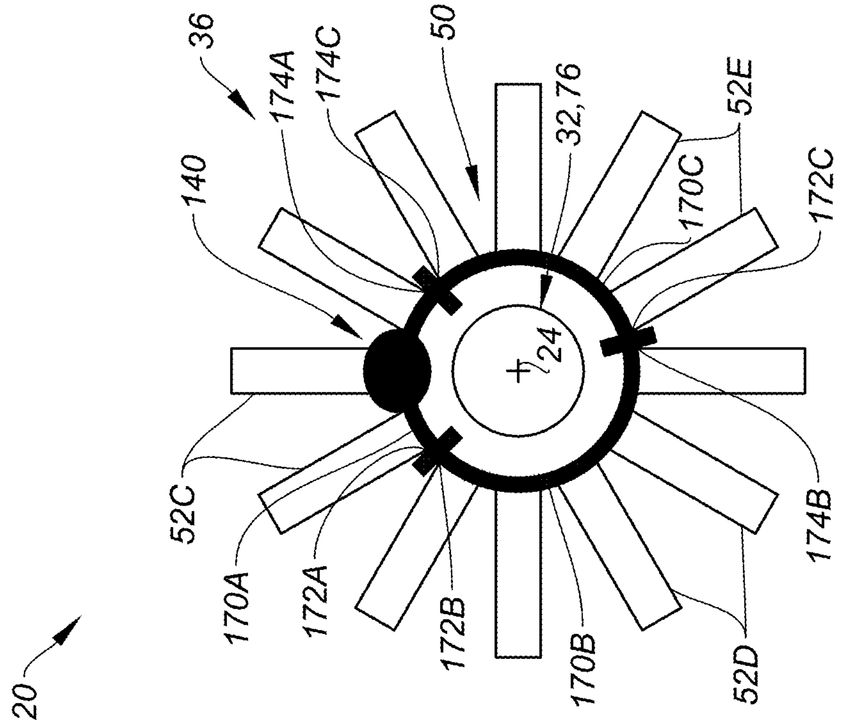
FIG. 8 schematically illustrates a cutaway view of another segmented guide vane structure in a stowed arrangement, in accordance with one or more embodiments of the present disclosure.

In some embodiments, referring to FIGS. 8 and 9, the structure base 50 may be circumferentially segmented into a plurality of structure segments 170A-C (generally referred to as "170"). Each of these structure segments 170A-C extends circumferentially about the propulsion system axis 24 and the turbine engine 32 between circumferentially opposing ends 172A-C (generally referred to as "172") and 174A-C (generally referred to as "174") of the respective structure segment 170A-C. Here, the ends 172A and 174A are opposing ends of the first structure segment 170A. The ends 172B and 174B are opposing ends of the second structure segment 170B. The ends 172C and 174C are opposing ends of the third structure segment 170C. Each of the structure segments 170B, 170C, for example, may extend between forty-five degrees (45°) and one-hundred and sixty degrees (160°) inclusive about the propulsion system axis 24 between its opposing circumferential ends 172B and 174B, 172C and 174C. More particularly, each structure segment 170B, 170C may extend between sixty degrees (60°) and one-hundred and twenty degrees (120°) inclusive about the propulsion system axis 24 between its opposing circumferential ends 172B and 174B, 172C and 174C. The first structure segment 170A may then extend a remainder of the full three-hundred-and-sixty-degree hoop of the structure base 50 about the propulsion system axis 24 between its opposing circumferential ends 172A and 174A.

The first structure segment 170A of FIG. 8 (e.g., a top structure segment, a fixed structure segment, etc.) may be mounted to, integrated with and/or otherwise connected to the pylon structure 142. Additionally or alternatively, first structure segment 170A of FIG. 8 (e.g., a top structure segment, a fixed structure segment, etc.) may be mounted to, integrated with, and/or otherwise connected to the nacelle 108 (e.g., the interior skeletal structure 140). The other structure segments 170B, 170C of FIG. 8 (e.g., side structure segments, movable structure segments, etc.) are collectively disposed diametrically opposite the first structure segment 170A. At the segment first ends 172A and 172B, the second structure segment 170B is movably attached (e.g., pivotably attached) to the first structure segment 170A. Similarly, at the segment second ends 174A and 174C, the third structure segment 170C is movably attached (e.g., pivotably attached) to the first structure segment 170A. At the second structure second end 174B and at the third structure first end 172C, the structure segments 170B and 170C are removably attached (e.g., mechanically fastened, latched, etc.) to one another at a joint between the second structure segment 170B and the third structure segment 170C. With this arrangement, the second structure segment 170B and/or the third structure segment 170C may each be pivoted or otherwise moved from a stowed position (e.g., see FIG. 8 position for propulsion system operation) to an open position (e.g., see FIG. 9 position for turbine engine maintenance, inspection, replacement, etc.). The opening of the structure sections 170B and/or 170C provides access to the turbine engine 32 and its engine core 76 for maintenance, inspection and/or otherwise. The opening of the structure sections 170B and/or 170C may also provide an opening through which the turbine engine 32 and its engine core 76 and/or other turbine engine components, etc. may be removed from or installed with the aircraft propulsion system 20 (e.g., as illustrated in FIG. 9).

Each structure segment 170A-C of FIG. 8 is associated with a set of one or more of the guide vanes 52C-E (generally referred to as "52"). Each of the first set guide vanes 52C is connected to and projects radially out from the first structure segment 170A. Each of the second set guide vanes 52D is connected to and projects radially out from the second structure segment 170B. Each of the third set guide vanes 52E is connected to and projects radially out from the third structure segment 170C. Note, while each set of the guide vanes 52 in FIG. 8 is shown with a different number of the guide vanes 52, it is contemplated any two or more of the guide vane sets may alternatively be configured with a common number of the guide vanes 52.

Figure 11:
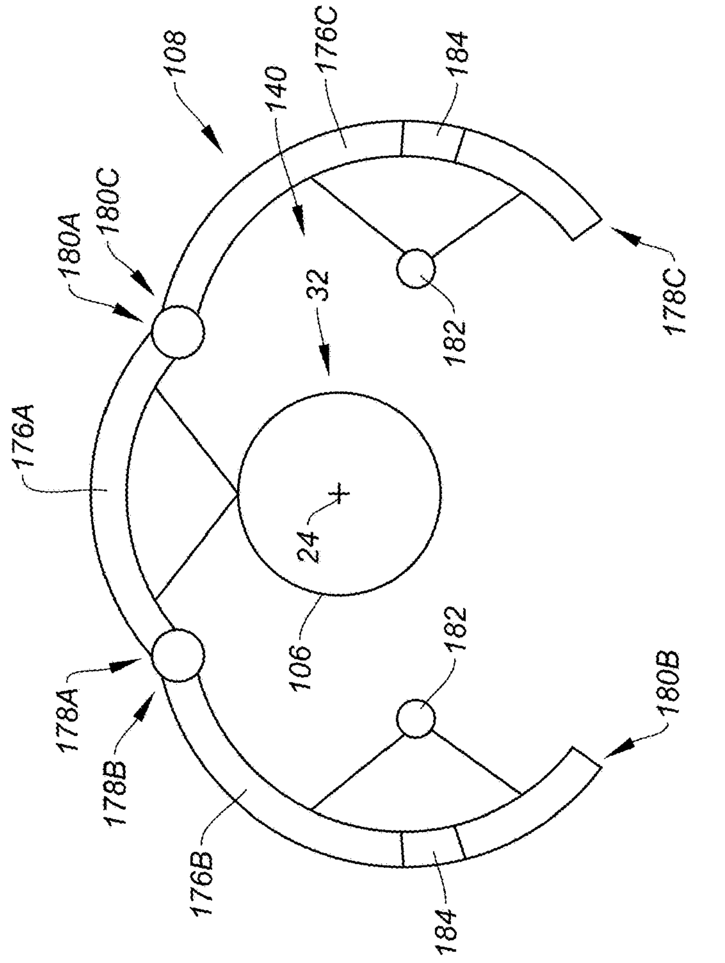
FIG. 11 schematically illustrates a cutaway view of the segmented nacelle interior skeletal structure of FIG. 10 in an open arrangement, in accordance with one or more embodiments of the present disclosure.
Figure 10:
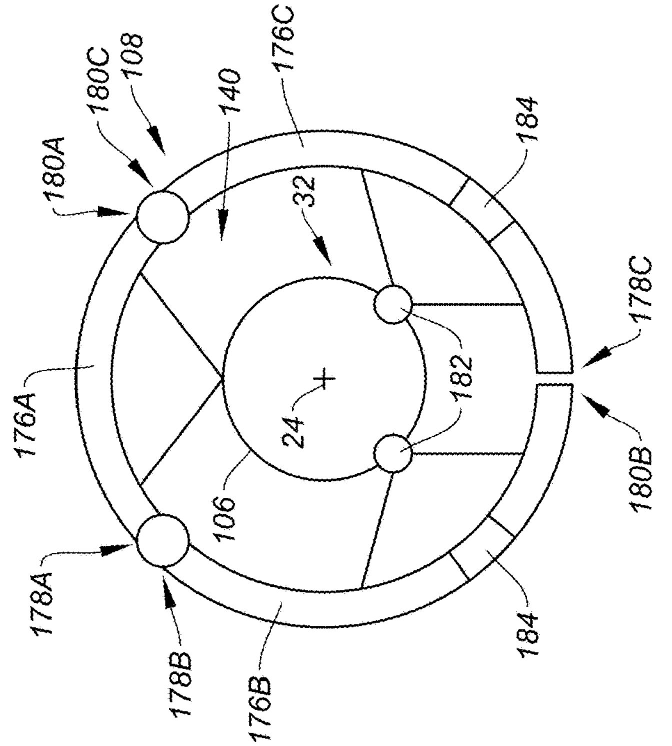
FIG. 10 schematically illustrates a cutaway view of a segmented nacelle interior skeletal structure in a stowed arrangement, in accordance with one or more embodiments of the present disclosure.

In some embodiments, referring to FIGS. 10 and 11, the nacelle 108 and its interior skeletal structure 140 (e.g., at the aft nacelle structure 112) may be circumferentially segmented into a plurality of structure segments 176A-C. Each of these structure segments 176A-C extends circumferentially about the propulsion system axis 24 and the turbine engine 32 between circumferentially opposing ends 178A-C (generally referred to as "178") and 180A-C (generally referred to as "180") of the respective structure segment 176A-C. Here, the ends 178A and 180A are opposing ends of the first structure segment 176A. The ends 178B and 180B are opposing ends of the second structure segment 176B. The ends 178C and 180C are opposing ends of the third structure segment 176C. Each of the structure segments 176B, 176C, for example, may extend between forty-five degrees (45°) and one-hundred and sixty degrees (160°) inclusive about the propulsion system axis 24 between its opposing circumferential ends 178B and 180B, 178C and 180C. More particularly, each structure segment 176B, 176C may extend between sixty degrees (60°) and one-hundred and twenty degrees (120°) inclusive about the propulsion system axis 24 between its opposing circumferential ends 178B and 180B, 178C and 180C. The first structure segment 176A may then extend a remainder of the full three-hundred-and-sixty-degree hoop of the nacelle 108 about the propulsion system axis 24 between its opposing circumferential ends 178A and 180A.

The first structure segment 176A of FIG. 10 (e.g., a top structure segment, a fixed structure segment, etc.) may be mounted to or otherwise connected to the pylon structure 142 (see FIGS. 1-4). The first structure segment 176A includes the interior skeletal structure 140 forming the mounts 146, 148 and/or 152 between the interior skeletal structure 140 and the engine case assembly 106 (see FIGS. 3-4). The other structure segments 176B, 176C of FIG. 10 are (e.g., side structure segments, movable structure segments, etc.) collectively disposed diametrically opposite the first structure segment 176A. At the segment first ends 178A and 178B, the second structure segment 176B is movably attached (e.g., pivotably attached) to the first structure segment 176A. Similarly, at the segment second ends 180A and 180C, the third structure segment 176C is movably attached (e.g., pivotably attached) to the first structure segment 176A. At the second structure second end 180B and at the third structure first end 178C, the structure segments 176B and 176C are removably attached (e.g., mechanically fastened, latched, etc.) to one another at a joint between the second structure segment 176B and the third structure segment 176C. With this arrangement, the second structure segment 176B and/or the third structure segment 176C may each be pivoted or otherwise moved from a stowed position (e.g., see FIG. 10 position for propulsion system operation) to an open position (e.g., see FIG. 11 position for turbine engine maintenance, inspection, replacement, etc.). The opening of the structure sections 176B and/or 176C provides access to the turbine engine 32 and its engine core 76 for maintenance, inspection and/or otherwise. The opening of the structure sections 176B and/or 176C may also provide an opening through which the turbine engine 32 and its engine core 76 and/or other turbine engine components, etc. may be removed from or installed with the aircraft propulsion system 20.

In some embodiments, each of the pivotable structure segments 176B and 176C may include at least one engine contact point 182 formed by the interior skeletal structure 140. The engine contact points 182 are configured to be selectively mounted to or to otherwise contact the engine case assembly 106 with the pivotable structure segments 176B and 176C in their respective stowed positions, for example, to further structurally support the engine core 76 at additional circumferential positions. The interior skeletal structure 140 at each of the pivotable structure segments 176B and 176C may be attached (e.g., mechanically fastened, fixed, etc.) to the engine case assembly 106 at the engine contact points 182. In some embodiments, the pivotable structure segments 176B and 176C may include respective detachable access panels 184 at the exterior flow boundary 56 and configured to facilitate access to the engine contact points 182 from the exterior of the propulsion system 20 and with the pivotable structure segments 176B and 176C in their respective stowed positions. For example, with the pivotable structure segments 176B and 176C in their respective stowed positions, the access panels 184 may be removed to provide access to the engine contact points 182 to facilitate installation or removal of mechanical fasteners attaching the interior skeletal structure 140 to the engine case assembly 106 at the engine contact points 182.

Figure 12B:
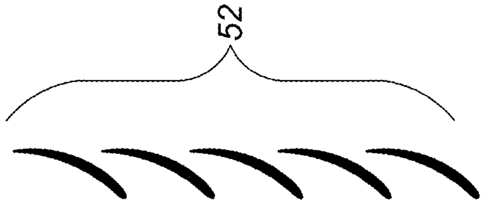
FIGS. 12A-B illustrate a plan view of guide vanes in various pitch positions, in accordance with one or more embodiments of the present disclosure.
Figure 12A:
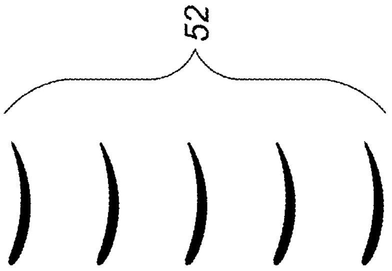

In some embodiments, referring to FIGS. 12A and 12B, some or all of the guide vanes 52 may each be pivotable between a feather position (see FIG. 12A) and an access position (e.g., see FIG. 12B). Between the feather position of FIG. 12A and the access position of FIG. 12B, each respective guide vane 52 may pivot at least or more than sixty degrees (60°) or seventy degrees (70°) (e.g., between seventy-five degrees (75°) and eighty-five degrees (85°), inclusive). By pivoting the respective guide vanes 52 to the access position of FIG. 12B, these guide vanes 52 may be positioned to facilitate nesting of the guide vanes 52 while the respective structure segment 170B, 170C (see FIGS. 8 and 9) is opened. Of course, in other embodiments, it is contemplated the structure segment(s) 170B, 170C (see FIGS. 8 and 9) may be opened without pivoting the respective guide vanes 52 to a particular position. In still other embodiments, it is contemplated one or more of the respective guide vanes 52 may be removed to provide additional room for opening the structure segment(s) 170B, 170C (see FIGS. 8 and 9).

In some embodiments, referring to FIG. 2, the vane actuation system 62 may be configured as part of the guide vane structure module 138. However, it is also contemplated the vane actuation system 62 may alternatively be installed independent of the guide vane structure 36.

Figure 13:
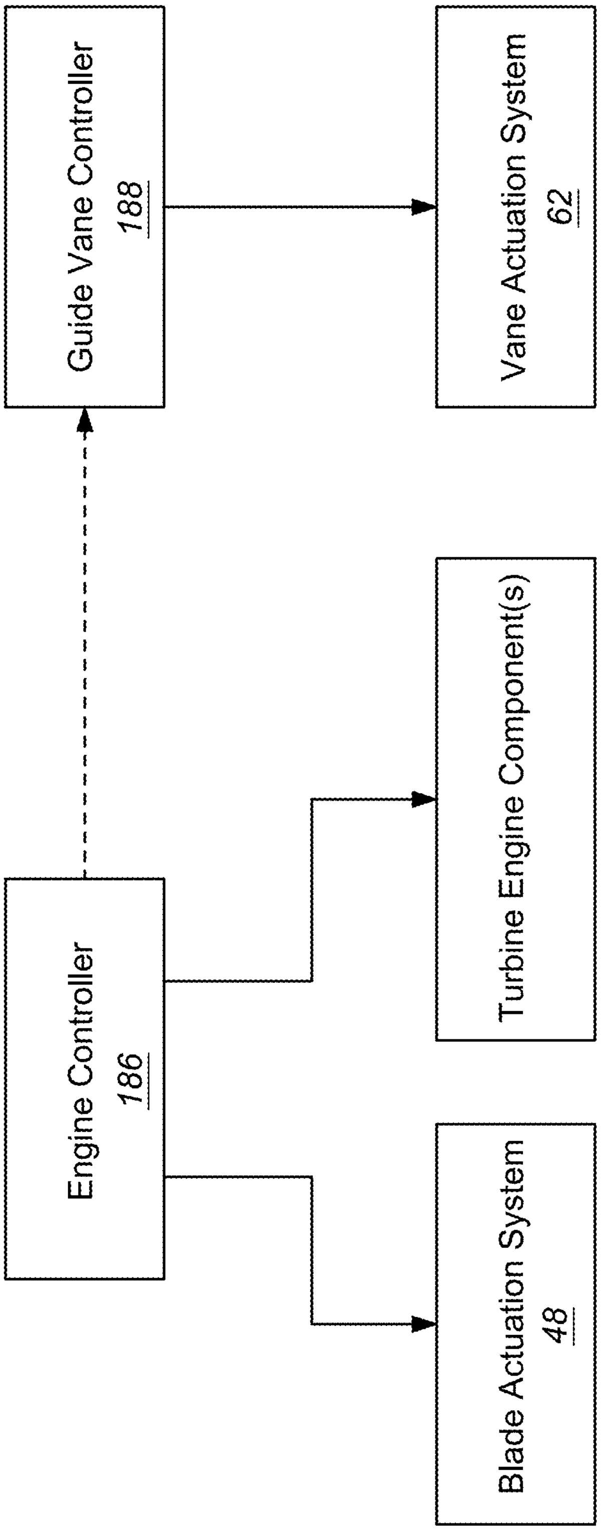
FIG. 13 schematically illustrates aircraft propulsion system actuation systems controlled by multiple controllers, in accordance with one or more embodiments of the present disclosure.

In some embodiments, referring to FIG. 13, the aircraft propulsion system 20 may be configured with multiple discrete controllers such as an onboard engine controller 186 and a guide vane controller 188. Examples of the engine controller 186 include, but are not limited to, an electronic engine controller (EEC), an electronic control unit (ECU), a full-authority digital engine controller (FADEC), etc. This engine controller 186 is configured to control and/or monitor operation of various turbine engine component(s) as well as various other propulsion system members including the blade actuation system 48. By contrast, the guide vane controller 188 is configured to control operation of the vane actuation system 62. While this guide vane controller 188 is physically discrete from the engine controller 186 and may (or may not) be located remote from the engine controller 186, the guide vane controller 188 may be in signal communication with (e.g., hardwired and/or wirelessly coupled to) the engine controller 186 to coordinate operation of the various actuation systems (e.g., 48 and 62 of FIG. 2). Of course, in other embodiments, it is contemplated the single engine controller 186 may also (e.g., directly) control operation of the vane actuation system 62.

Figure 15:
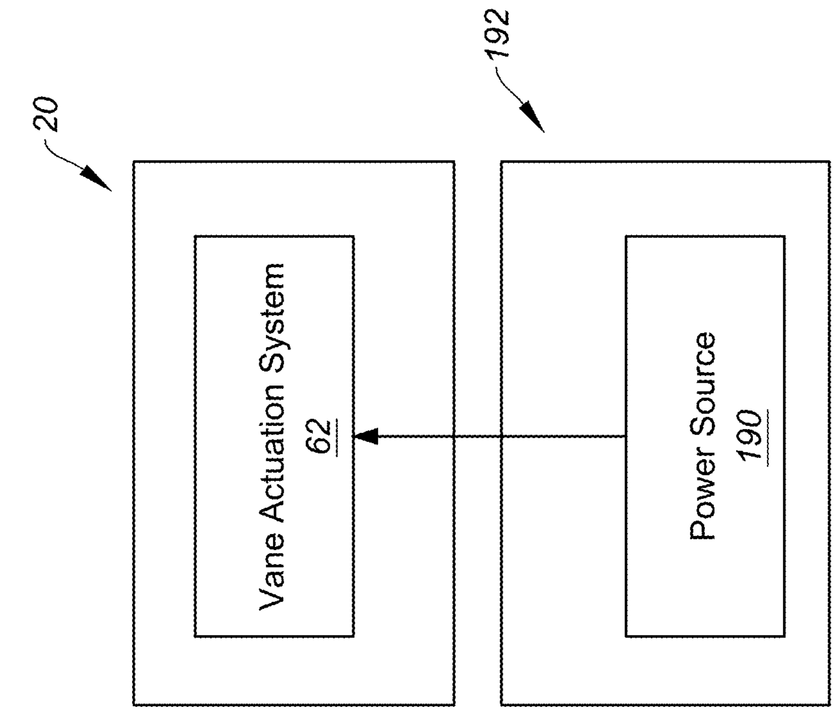
FIG. 15 schematically illustrates the vane actuation system with another power source arrangement, in accordance with one or more embodiments of the present disclosure.
Figure 14:
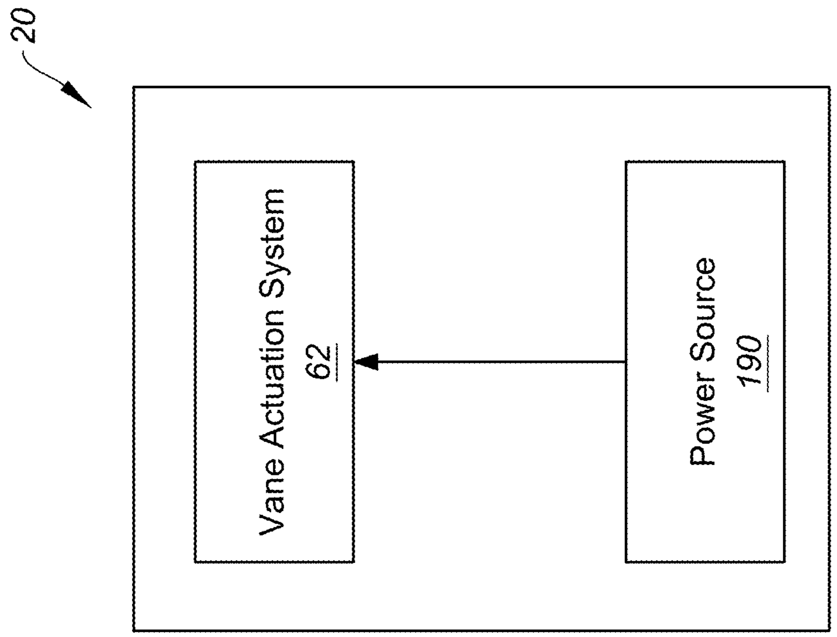
FIG. 14 schematically illustrates a vane actuation system with a power source arrangement, in accordance with one or more embodiments of the present disclosure.

In some embodiments, referring to FIG. 14, the vane actuation system 62 may be powered by a power source 190 onboard the aircraft propulsion system 20. The vane actuation system 62, for example, may be electrically powered by a generator and/or electrical power bus onboard the aircraft propulsion system 20. In another example, the vane actuation system 62 may be pneumatically powered by an air system (e.g., a bleed system) onboard the aircraft propulsion system 20. In still another example, the vane actuation system 62 may be fluidly powered (e.g., hydraulically powered) by a fluid system onboard the aircraft propulsion system 20. Here, a working fluid for the fluid system may be lubricant, coolant, fuel, or the like. In other embodiments, referring to FIG. 15, the power source 190 may be remote from the aircraft propulsion system 20. The power source 190 of FIG. 15, for example, may be arranged in at least one member 192 of an airframe of the aircraft (e.g., in an aircraft fuselage, in an aircraft wing and/or in the pylon structure 142).

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. An assembly for an aircraft propulsion system, the assembly comprising:

an open propulsor rotor comprising a plurality of open propulsor blades arranged circumferentially around an axis, each of the plurality of open propulsor blades projecting radially out into an environment external to the aircraft propulsion system;

a housing structure comprising an upstream housing end, the upstream housing end disposed downstream of the plurality of open propulsor blades, the housing structure comprising an engine case assembly and a nacelle, the nacelle disposed radially outboard of the engine case assembly, the nacelle forming at least a portion of an exterior flow boundary for the aircraft propulsion system that borders the environment external to the aircraft propulsion system, the nacelle comprising a nacelle interior skeletal structure mounted to the engine case assembly at a forward mount, an aft mount, and one or more intermediate mounting points axially between the forward mount and the aft mount, the nacelle interior skeletal structure supporting the open propulsor rotor and the engine case assembly;

a compressor section, a combustor section, and a turbine section each housed within the engine case assembly, the turbine section comprising a turbine rotor operatively coupled to the open propulsor rotor, and the turbine rotor configured to drive rotation of the open propulsor rotor about the axis; and a flowpath extending through the compressor section, the combustor section, and the turbine section from an inlet into the flowpath to an exhaust from the flowpath.

2. The assembly of claim 1, wherein the nacelle interior skeletal structure is configured for mounting the engine case assembly to a pylon structure of an aircraft.

3. The assembly of claim 1, wherein the engine case assembly comprises a front center body at the upstream housing end, the front center body forms the inlet, and the nacelle interior skeletal structure is mounted to the front center body at the forward mount.

4. The assembly of claim 3, wherein the engine case assembly further comprises a turbine exhaust case forming a portion of the flowpath downstream of the turbine section, and the nacelle interior skeletal structure is mounted to the turbine exhaust case at the aft mount.

5. The assembly of claim 1, further comprising a guide vane structure comprising a guide vane structure base disposed at the exterior flow boundary, the forward mount disposed between the upstream housing end and the guide vane structure base.

6. The assembly of claim 1, wherein the nacelle interior skeletal structure comprises a composite structure material.

7. The assembly of claim 1, wherein the nacelle interior skeletal structure comprises a fixed structure segment, a first pivotable structure segment, and a second pivotable structure segment, the fixed structure segment is mounted to the engine case assembly at the forward mount and the aft mount, the first pivotable structure segment and the second pivotable structure segment are each pivotably mounted to the fixed structure segment, the first pivotable structure segment and the second pivotable structure segment are each pivotable between a stowed position and an open position.

8. The assembly of claim 7, further comprising a guide vane structure comprising a guide vane structure base disposed at the exterior flow boundary, the first pivotable structure segment and the second pivotable structure segment disposed aft of the guide vane structure base.

9. The assembly of claim 7, wherein each of the first pivotable structure segment and the second pivotable structure segment forms a contact point configured to contact the engine case assembly in the stowed position.

10. The assembly of claim 9, wherein each of the first pivotable structure segment and the second pivotable structure segment is configured to be fixedly attached to the engine case assembly at the contact point in the stowed position.

11. The assembly of claim 10, wherein each of the first pivotable structure segment and the second pivotable structure segment comprises a detachable access panel at the exterior flow boundary.

12. The assembly of claim 1, wherein the nacelle interior skeletal structure is configured to support at least 50 percent of a bending load of the propulsion system.

13. The assembly of claim 1, further comprising a guide vane structure comprising a guide vane structure base disposed at the exterior flow boundary, and the guide vane structure base is formed by a portion of the nacelle extending circumferentially about the axis.

14. The assembly of claim 13, wherein the guide vane structure further comprises a plurality of open guide vanes coupled to the guide vane structure base.

15. An assembly for an aircraft propulsion system, the assembly comprising:

an open propulsor rotor comprising a plurality of open propulsor blades arranged circumferentially around an axis, each of the plurality of open propulsor blades projecting radially out into an environment external to the aircraft propulsion system;

a housing structure comprising an upstream housing end, the upstream housing end disposed downstream of the plurality of open propulsor blades, the housing structure comprising an engine case assembly and a nacelle, the nacelle disposed radially outboard of the engine case assembly, the nacelle forming at least a portion of an exterior flow boundary for the aircraft propulsion system that borders the environment external to the aircraft propulsion system, the nacelle comprising a nacelle interior skeletal structure, the nacelle interior skeletal structure supporting the open propulsor rotor and the engine case assembly, the nacelle interior skeletal structure configured for mounting the engine case assembly to a pylon structure of an aircraft;

a compressor section, a combustor section, and a turbine section each housed within the engine case assembly, the turbine section comprising a turbine rotor operatively coupled to the open propulsor rotor, and the turbine rotor configured to drive rotation of the open propulsor rotor about the axis; and a flowpath extending through the compressor section, the combustor section, and the turbine section from an inlet into the flowpath to an exhaust from the flowpath;

wherein the nacelle interior skeletal structure comprises a fixed structure segment, a first pivotable structure segment, and a second pivotable structure segment, the fixed structure segment configured to mount the engine case assembly to the pylon structure, the first pivotable structure segment and the second pivotable structure segment each pivotably mounted to the fixed structure segment, the first pivotable structure segment and the second pivotable structure segment each pivotable between a stowed position and an open position, each of the first pivotable structure segment and the second pivotable structure segment forming a contact point configured to contact the engine case assembly in the stowed position.

16. An assembly for an aircraft propulsion system, the assembly comprising:

an open propulsor rotor comprising a plurality of open propulsor blades arranged circumferentially around an axis, each of the plurality of open propulsor blades projecting radially out into an environment external to the aircraft propulsion system;

a housing structure comprising an upstream housing end, the upstream housing end disposed downstream of the plurality of open propulsor blades, the housing structure comprising an engine case assembly and a nacelle, the nacelle disposed radially outboard of the engine case assembly, the nacelle forming at least a portion of an exterior flow boundary for the aircraft propulsion system that borders the environment external to the aircraft propulsion system, the nacelle comprising a nacelle interior skeletal structure mounted to the engine case assembly at a forward mount proximate the upstream housing end and an aft mount, the nacelle interior skeletal structure configured to support at least 50 percent of a bending load of the aircraft propulsion system;

a guide vane structure base disposed between the forward mount and the aft mount, the guide vane structure base further forming the exterior flow boundary;

a plurality of open guide vanes coupled to the guide vane structure base;

a compressor section, a combustor section, and a turbine section each housed within the engine case assembly, the turbine section comprising a turbine rotor operatively coupled to the open propulsor rotor, and the turbine rotor configured to drive rotation of the open propulsor rotor about the axis; and a flowpath extending through the compressor section, the combustor section, and the turbine section from an inlet into the flowpath to an exhaust from the flowpath; and wherein the nacelle interior skeletal structure is mounted to the engine case assembly at one or more intermediate mounting points axially between the forward mount and the aft mount.

17. The assembly of claim 16, wherein the engine case assembly comprises a front center body at the upstream housing end, the front center body forms the inlet, and the nacelle interior skeletal structure is mounted to the front center body at the forward mount.

18. The assembly of claim 16, wherein the nacelle interior skeletal structure comprises a fixed structure segment, a first pivotable structure segment, and a second pivotable structure segment, the fixed structure segment is mounted to the engine case assembly at the forward mount and the aft mount, the first pivotable structure segment and the second pivotable structure segment are each pivotably mounted to the fixed structure segment, the first pivotable structure segment and the second pivotable structure segment are each pivotable between a stowed position and an open position.

19. The assembly of claim 18, wherein each of the first pivotable structure segment and the second pivotable structure segment forms a contact point configured to contact the engine case assembly in the stowed position.

* * * * *